US007318574B2

(12) United States Patent
Lee

(10) Patent No.: US 7,318,574 B2
(45) Date of Patent: Jan. 15, 2008

(54) TOOL KIT

(76) Inventor: Chang Chuan Lee, P.O. Box 2103, Taichung City (TW)

( * ) Notice: Subject to any disclaimer, the term of this patent is extended or adjusted under 35 U.S.C. 154(b) by 0 days.

(21) Appl. No.: 11/015,005

(22) Filed: Dec. 20, 2004

(65) Prior Publication Data

US 2006/0131472 A1 Jun. 22, 2006

(51) Int. Cl.
*F16M 11/00* (2006.01)

(52) U.S. Cl. ...................... 248/682; 220/751; 206/349; 206/806

(58) Field of Classification Search ................ 248/682, 248/684, 685, 686, 690; 206/469, 461, 470, 206/45.34, 467, 349, 463, 464, 471, 806; 220/751, 4.21; D9/415, 416, 418, 420
See application file for complete search history.

(56) References Cited

U.S. PATENT DOCUMENTS

| | | | | | |
|---|---|---|---|---|---|
| 3,174,621 | A | * | 3/1965 | Watson | 206/470 |
| 4,166,535 | A | * | 9/1979 | Gilling | 206/470 |
| 4,602,719 | A | * | 7/1986 | Borst | 220/263 |
| 4,739,883 | A | * | 4/1988 | Mohs et al. | 206/470 |
| 4,803,048 | A | * | 2/1989 | Nason | 422/58 |
| D311,683 | S | * | 10/1990 | Diba et al. | D9/415 |
| 5,037,000 | A | * | 8/1991 | Selame | 221/303 |
| 5,154,293 | A | * | 10/1992 | Gould | 206/461 |
| 5,209,354 | A | * | 5/1993 | Thornhill et al. | 206/469 |
| D338,619 | S | * | 8/1993 | Mylander et al. | D9/415 |
| D363,217 | S | * | 10/1995 | Flynn | D9/415 |
| D368,028 | S | * | 3/1996 | Baker | D9/415 |
| D368,029 | S | * | 3/1996 | Baker | D9/415 |
| 6,016,914 | A | * | 1/2000 | Gustafson | 206/470 |
| 6,070,723 | A | * | 6/2000 | Lewis | 206/335 |
| 6,237,772 | B1 | * | 5/2001 | LaMarche et al. | 206/470 |
| 6,279,746 | B1 | * | 8/2001 | Hussaini et al. | 206/470 |
| 2005/0082185 | A1 | * | 4/2005 | Lee | 206/335 |

* cited by examiner

*Primary Examiner*—A. Joseph Wujciak, III
(74) *Attorney, Agent, or Firm*—Rosenberg, Klein & Lee

(57) ABSTRACT

A tool kit structure including a tool kit having a bottom box and an upper cover. One side of the upper cover is formed with a recessed section. Two lateral sides of the recessed section are respectively formed with two longitudinally extending lugs opposite to each other. A hanging block is connected with a bottom of the recessed section. The hanging block is conveniently closable/openable. The hanging block is formed with a hanging hole for hanging the tool kit for exhibition. The top of the upper cover is formed with a turning depression near the side of the upper cover. After the hanging block is closed into the recessed section, the turning depression serves as a turning space for a user to easily turn the hanging block. By means of the hanging block, the tool kit can be horizontally placed or vertically hung.

2 Claims, 6 Drawing Sheets

TOOL KIT

BACKGROUND OF THE INVENTION

The present invention is related to an improved tool kit structure, and more particularly to a tool kit structure which can be horizontally placed or vertically hung.

The existent tool kit is generally horizontally placed. When used, a user can open an upper cover of the tool kit and take out a hand tool from the tool kit. After used, the hand tool is folded and horizontally placed into the bottom of the tool kit. Such horizontally placed tool kit necessitates greater room for storage. In addition, a user often can hardly conveniently take out and place in the hand tool.

FIG. 7 shows an improved tool kit for overcoming the above problem. One side of the bottom box 61 of the tool kit 6 is formed with two recessed sections 62 in which two hanging blocks 63 are rotationally foldably connected. Each hanging block 63 is formed with a hanging hole 631. By means of the hanging hole 631, after the hanging block 63 is unfolded, the tool kit 6 can be hung on a wall for exhibition. Alternatively, the hanging blocks 63 can be folded into the recessed sections 62, permitting the tool kit 6 to be placed horizontally. However, the hanging blocks 63 extend from the bottom face of the bottom box 61 to the lateral edge of the bottom box 61. In addition, after the hanging blocks 63 are received in the recessed sections 62, the hanging blocks 63 will slightly protrude from the lateral edge of the bottom box 61. Therefore, the tool kit 6 tends to be unexpectedly opened due to mis-touch. Moreover, simply the latch blocks of the ends of the hanging blocks 63 are latched in the notches in the recessed sections. In addition, the hanging blocks 63 are correspondingly fixed at remote ends of the recessed sections 62. It can be known from the relationship between force and force arm that the hanging blocks 63 are easy to loosen due to slight touch. Furthermore, the single latch block of the hanging block 63 can hardly provide sufficient engaging force.

SUMMARY OF THE INVENTION

It is therefore a primary object of the present invention to provide a tool kit structure in which one side of the upper box cover is formed with a recessed section. Two lateral sides of the recessed section are respectively formed with two longitudinally extending lugs opposite to each other. A hanging block is connected with a bottom of the recessed section. The hanging block is conveniently closable/openable. After the hanging block is closed into the recessed section, the lugs serve to abut against the hanging block to provide sufficient fixing force. Therefore, the hanging block is not easy to be unexpectedly opened due to mis-touch.

It is a further object of the present invention to provide the above tool kit structure in which the top of the upper box cover is formed with a turning depression near one side of the upper cover. After the hanging block is closed into the recessed section, the turning depression serves as a turning space for a user to easily open/close the hanging block.

According to the above objects, the tool kit structure of the present invention includes a tool kit having a bottom box and an upper box cover. One side of the upper cover is formed with a recessed section. Two lateral sides of the recessed section are respectively formed with two longitudinally extending lugs opposite to each other. A hanging block is connected with a bottom of the recessed section. The hanging block is conveniently closable/openable. The hanging block is formed with a hanging hole for hanging the tool kit for exhibition. The top of the upper box cover is formed with a turning depression near the side of the upper cover. After the hanging block is closed into the recessed section, the turning depression serves as a turning space for a user to easily turn the hanging block.

The present invention can be best understood through the following description and accompanying drawings wherein:

DETAILED DESCRIPTION OF THE PREFERRED EMBODIMENTS

Figure 1:
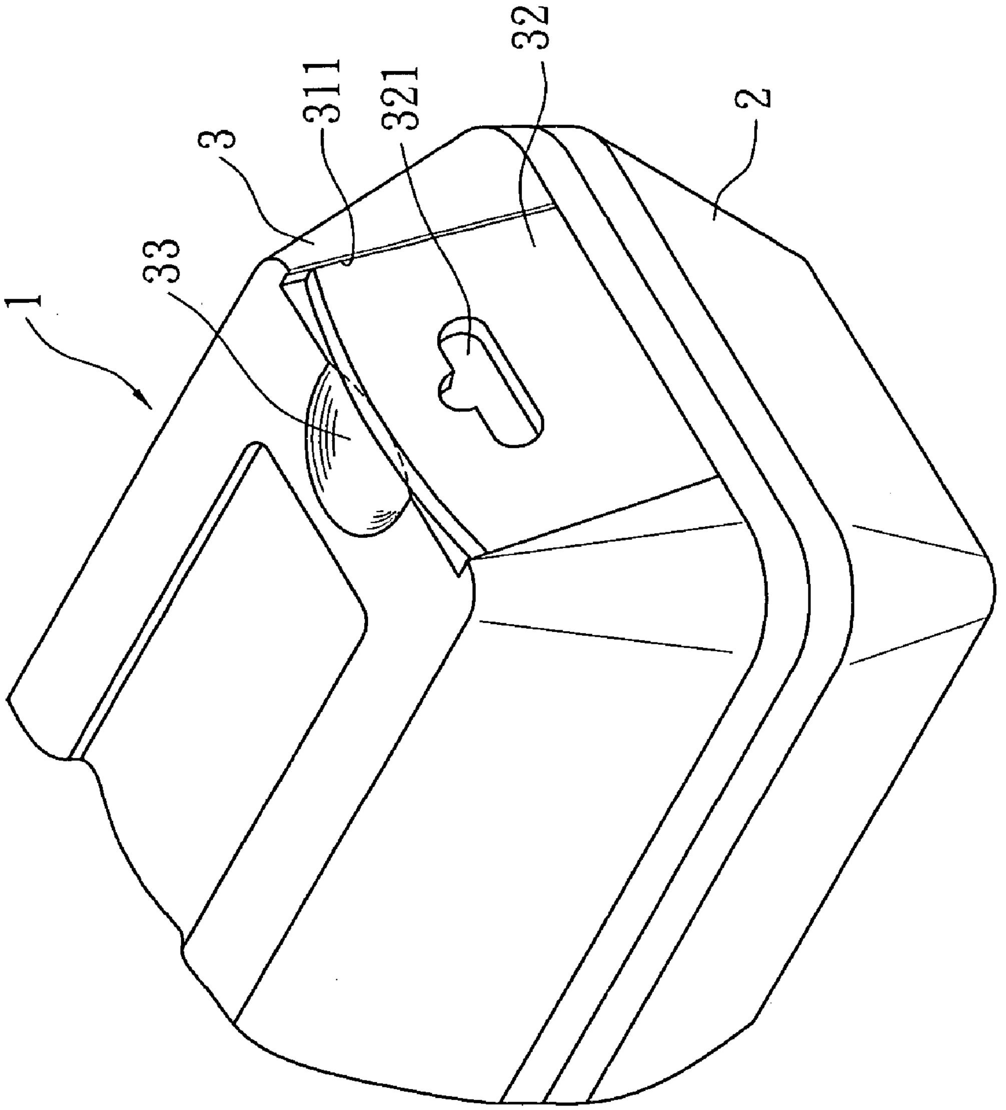
FIG. 1 is a perspective view of the tool kit of the present invention.

Please refer to FIG. 1. The tool kit structure of the present invention includes a tool kit 1 having a bottom box 2 and an upper box cover 3. One side of the upper box cover 3 is formed with a recessed section 31. Two lateral sides of the recessed section 31 are respectively formed with two longitudinally extending lugs 311 opposite to each other. A hanging block 32 is connected with a bottom of the recessed section 31. In this embodiment, top end of the hanging block 32 is arced for convenient opening/closing. The hanging block 32 is formed with a hanging hole 321 for hanging the tool kit 1 to exhibit the same. The top of the upper box cover 3 is formed with a turning depression 33 near the side of the upper box cover 3. Accordingly, after the hanging block 32 is closed into the recessed section 31, the turning depression 33 enables a user to easily turn the hanging block 32.

Figure 2:
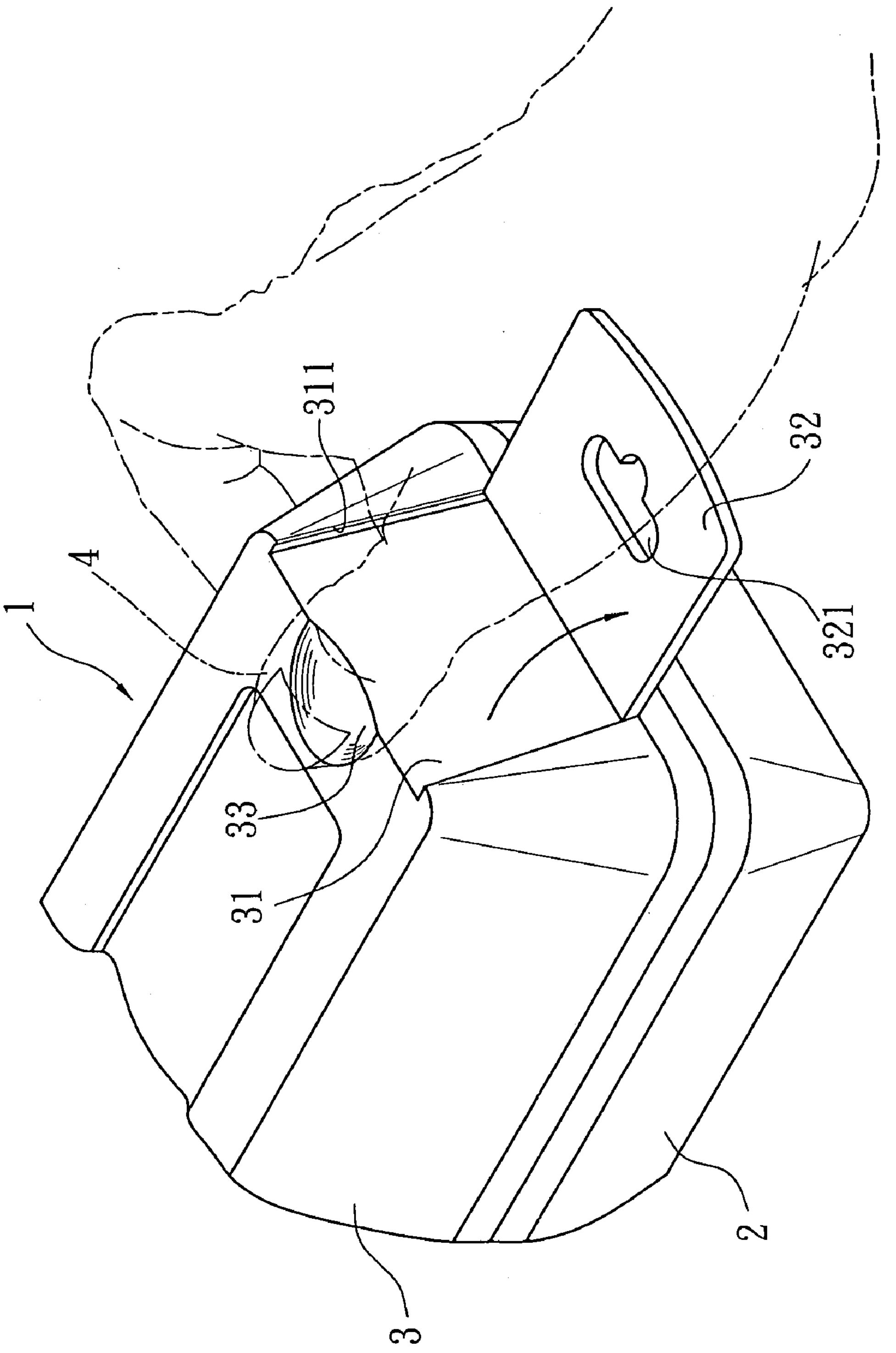
FIG. 2 is a perspective view according to FIG. 1, in which the hanging block is opened.
Figure 3:
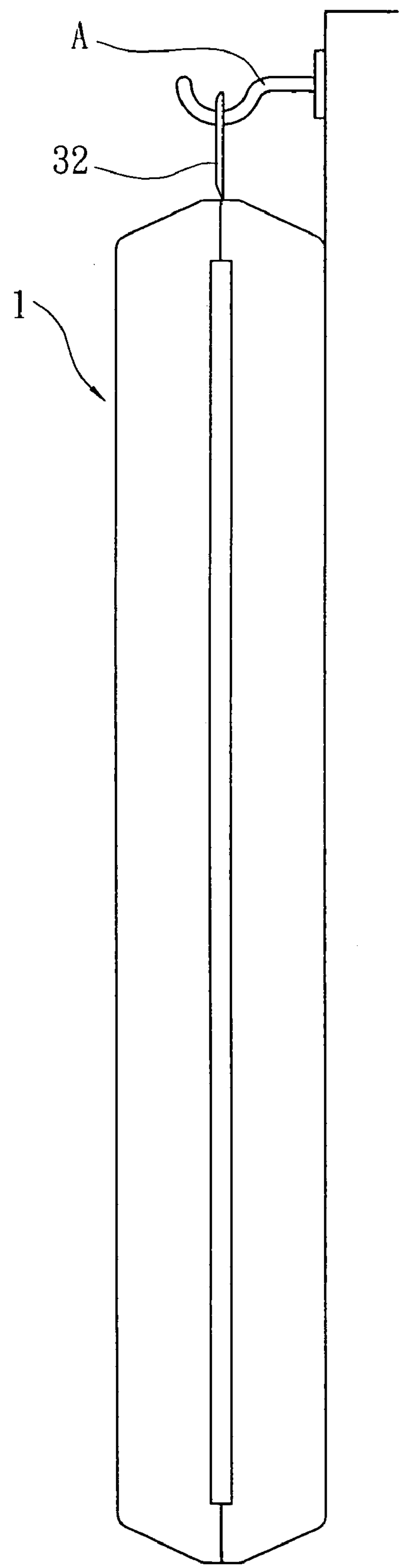
FIG. 3 is a side view showing that the tool kit of the present invention is hung on a wall.

Referring to FIG. 2, after the hand tools are placed in the tool kit, in the case that the storage room is insufficient or it is desired to hang the tool kit, a user's finger 4 can extend into the turning hole 33 to slightly exert a force onto the hanging block 32. At this time, the hanging block 32 can be disengaged from the lugs 311 on two sides of the recessed section 31 and turned out of the recessed section 31. The hanging block 32 is connected with the bottom of the recessed section 31 so that after the hanging block 32 is turned out, the hanging block 32 is positioned above the tool kit 1. Then, by means of the hanging hole 321, the hanging block 32 is hung on a hanging hook A on a wall. Accordingly, the tool kit 1 can be vertically hung on the wall as shown in FIG. 3.

The hanging block 32 is disposed on one side of the upper box cover 3. In addition, after the hanging block 32 is engaged in the recessed section 31, the crest of the arced top end of the hanging block 32 is just flush with the top of the upper box cover 3. Therefore, the possibility of mis-touch of the hanging block 32 is greatly minified. Moreover, the hanging block 32 is spaced from the bottom of the recessed section 31 by a shorter distance. It can be known from the relationship between force and force arm that the hanging block 32 is not so easy to loosen due to slight touch.

Figure 4:
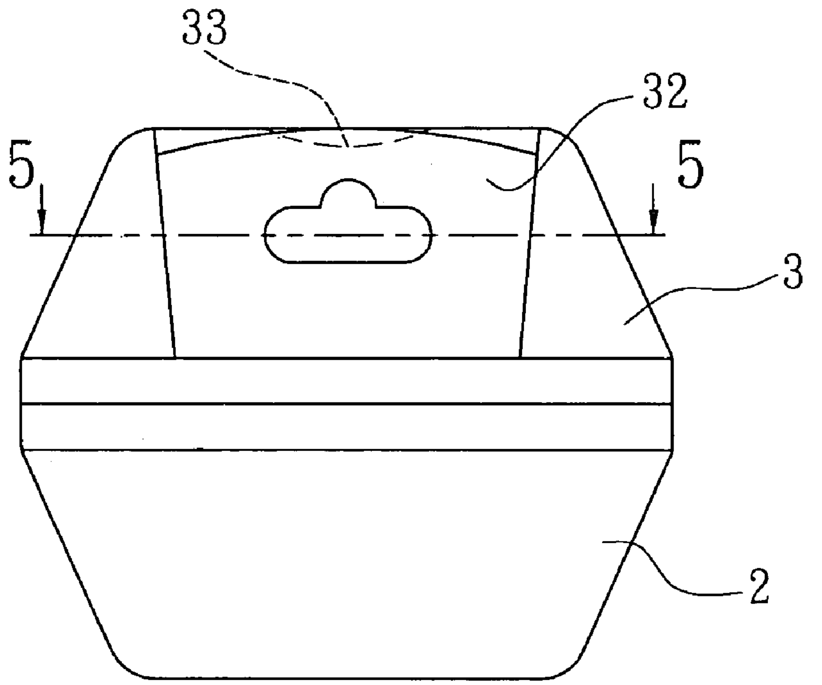
FIG. 4 is a side view of the tool kit of the present invention.
Figure 5:
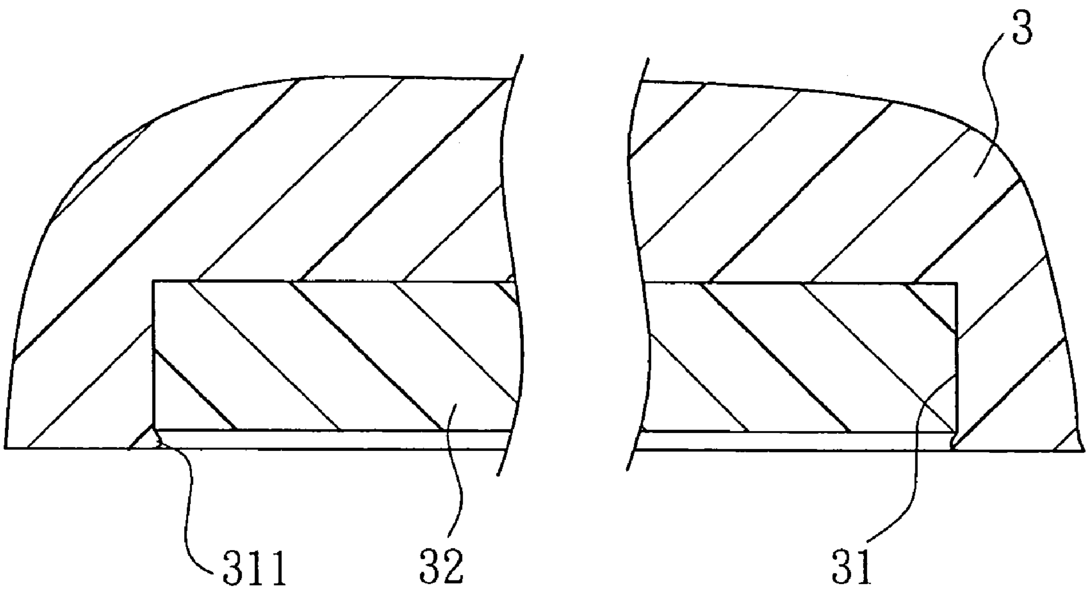
FIG. 5 is an enlarged sectional view taken along line 5-5 of FIG. 4.

Furthermore, as shown in FIGS. 4 and 5, two lateral sides of the recessed section 31 of the upper box cover 3 are respectively formed with two longitudinally extending lugs 311 opposite to each other. Therefore, after the hanging block 32 is engaged in the recessed section 31, the lugs 311 serve to abut against the hanging block 32 to provide sufficient fixing force.

Figure 6:
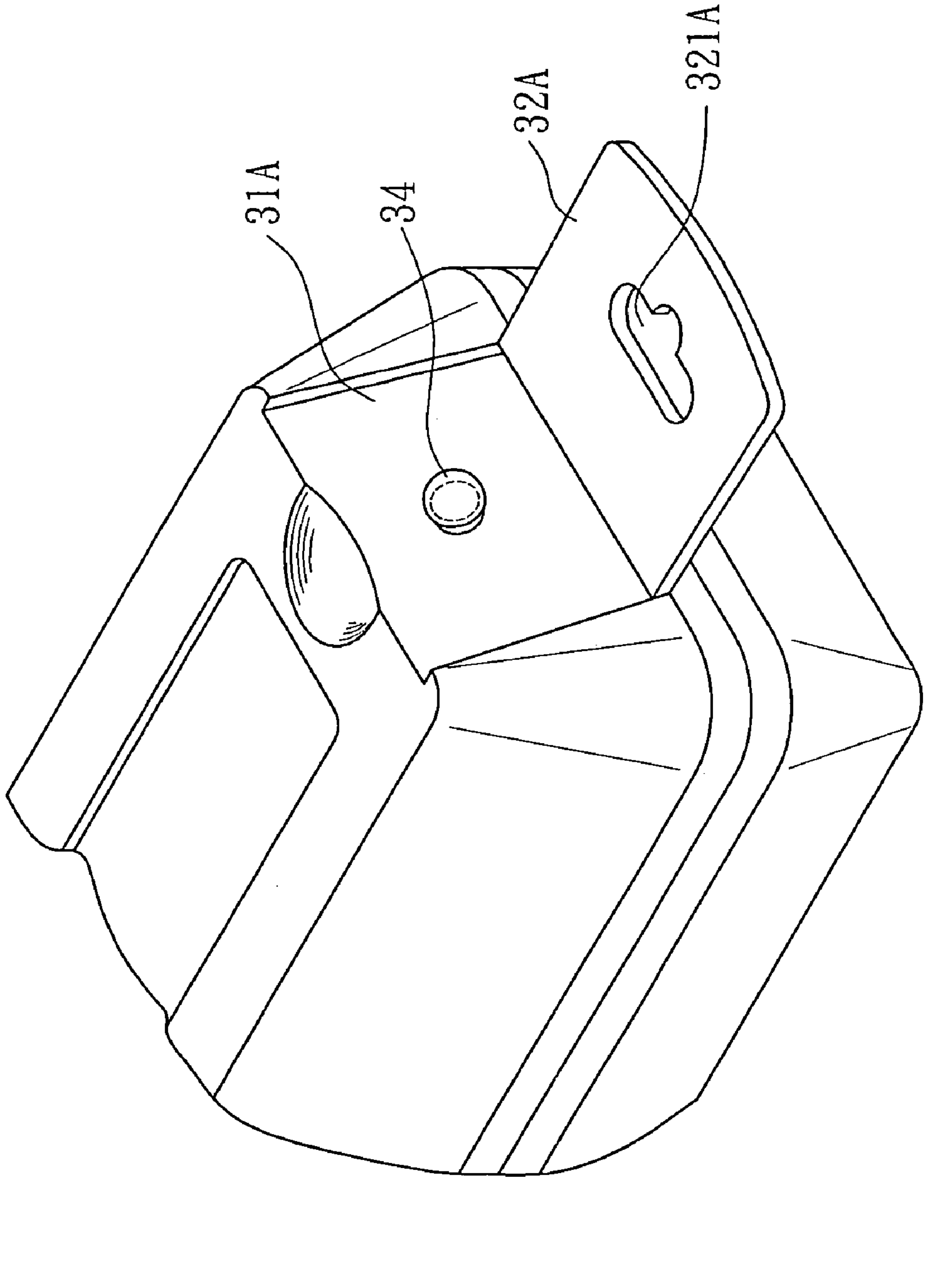
FIG. 6 is a perspective view of a second embodiment of the tool kit of the present invention.
Figure 7:
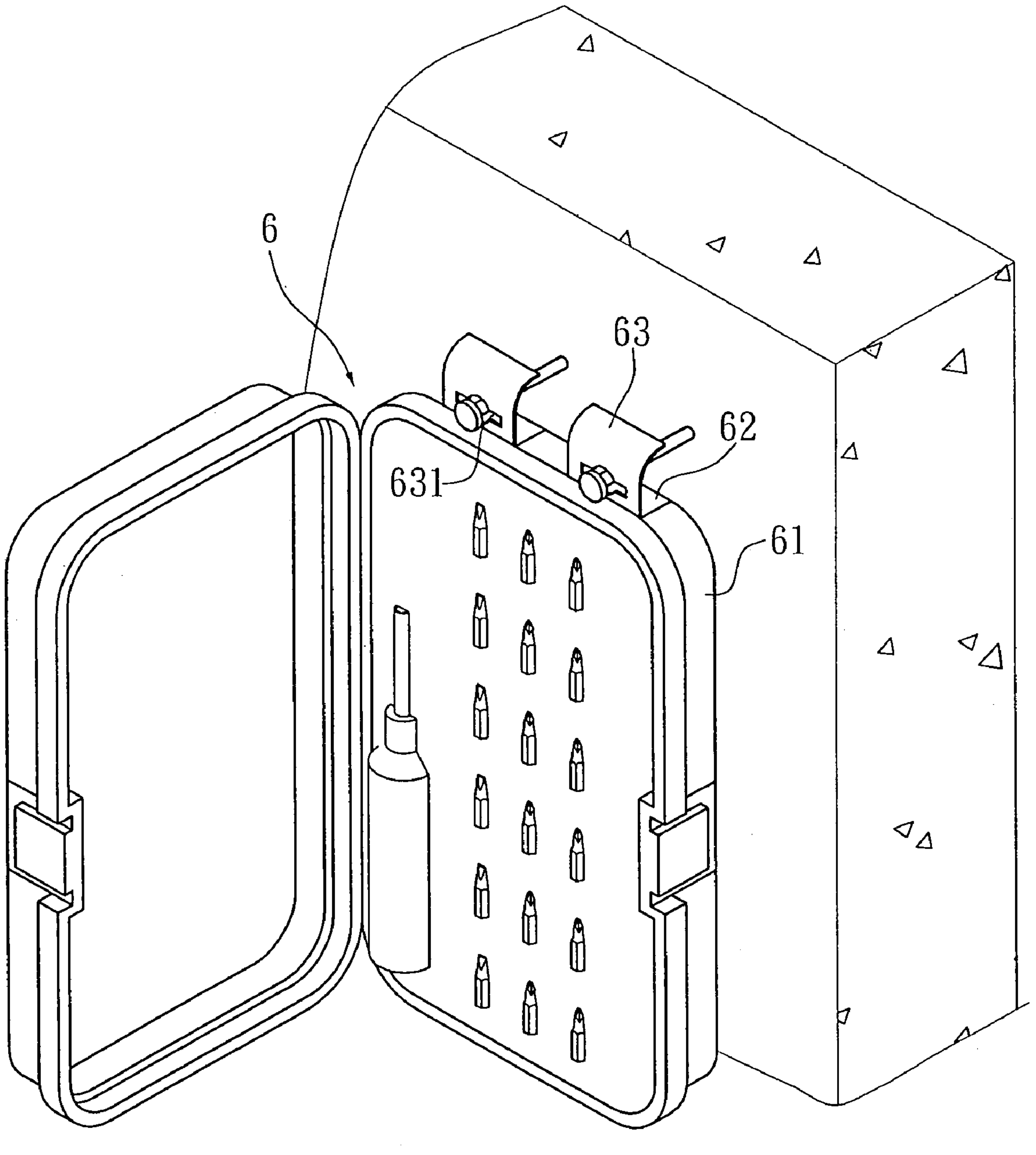
FIG. 7 PRIOR ART
FIG. 7 is a perspective view of a conventional tool kit.

FIG. 6 shows a second embodiment of the present invention, in which a projecting buckle 34 is disposed in the recessed section 31A. After the hanging block 32A is closed into the recessed section 31A, the projecting buckle 34 can be latched in the hanging hole 321A. This can achieve the same effect as the above embodiment.

The above embodiments are only used to illustrate the present invention, not intended to limit the scope thereof. Many modifications of the above embodiments can be made without departing from the spirit of the present invention.

What is claimed is:

1. A tool kit structure comprising a bottom box and an upper box cover for covering the bottom box, one side of the upper cover having a recessed section formed therein to define a cavity space and a hanging block hingedly connected with a bottom of the recessed section, the hanging block being reversibly displaceable to be received within the cavity space of the recessed section, the hanging block being formed with a hanging hole for hanging the tool kit for exhibition when the hanging block is displaced from the cavity space of the recessed section, the recessed section having two lateral opposing sides respectively formed with two longitudinally extending lugs each extending into the cavity space of the recessed section to releasably engage corresponding sides of the hanging block, a top portion of the upper box cover adjacent the side having the recessed section having a turning depression formed therein, the turning depression being in open communication with the cavity space of the recessed section, whereby after the hanging block is displaced into the recessed section, the turning depression serves as an access to the cavity space for a user to easily displace the hanging block from the cavity space.

2. The tool kit structure as claimed in claim 1, wherein a projecting buckle is disposed in the recessed section for releasable engagement with the hanging hole of the hanging block when the hanging block is displaced into the cavity space of the recessed section.

* * * * *